United States Patent [19]

Mori

[11] Patent Number: 4,703,995
[45] Date of Patent: Nov. 3, 1987

[54] LIGHT RADIATOR FOR DIFFUSING AND RADIATING LIGHT RAYS

[76] Inventor: Kei Mori, 3-16-3-501, Kaminoge, Setagaya-ku, Tokyo, Japan

[21] Appl. No.: 788,987

[22] Filed: Oct. 18, 1985

[30] Foreign Application Priority Data

Nov. 15, 1984 [JP] Japan .................... 59-241410

[51] Int. Cl.$^4$ .................................. G02B 7/20
[52] U.S. Cl. ..................... 350/96.10; 350/96.19; 350/96.20; 350/260; 362/32
[58] Field of Search ............... 350/96.10, 15, 18, 19, 350/20, 24, 28, 258–265, 418; 362/32

[56] References Cited

U.S. PATENT DOCUMENTS 3,510,195  5/1970  Noble ........................ 350/96.24
3,514,192  5/1970  De La Cierva ............. 350/418 X
4,609,974  9/1986  Mori ............................ 362/32

OTHER PUBLICATIONS

Cronquist, D. H., "Hollow Reflecting Light Collector Tube", IMB Technical Disclosure Bulletin, vol. 17, No. 3, 8-1974, pp. 906–908.

Primary Examiner—John Lee
Attorney, Agent, or Firm—Jordan and Hamburg

[57] ABSTRACT

The light radiator is comprised of a transparent cylinder, an optical conductor for guiding light rays into the cylinder through one end of the cylinder, an optical means movably accommodated inside of the cylinder for reflecting the light rays guided into the cylinder, and a driving means for moving the optical means along the axis of the cylinder, the driving means being comprised of transparent water placed in the cylinder and a liquid pump having one end connected with one end of the cylinder and the other end connected with the other end of the cylinder, and the water being moved inside of the cylinder by the use of the liquid pump.

6 Claims, 3 Drawing Figures

LIGHT RADIATOR FOR DIFFUSING AND RADIATING LIGHT RAYS

BACKGROUND OF THE INVENTION

The present invention relates to a light radiator for effectively diffusing and radiating light rays which have been transmitted through an optical cable or the like to the outside of the optical conductor cable.

The present applicant has previously proposed various ways to focus solar rays or artificial light rays by the use of lenses or the like and to guide the same into an optical conductor cable thereby transmitting them onto an optional desired place through the optical conductor cable. Solar rays or artificial light rays transmitted and emitted in such a way are employed for inducing photosynthesis and for use in illuminating or for other like purposes, as for example, to better promote the cultivation of plants.

However, in the case of utilizing the light energy for cultivating plants as mentioned above, the light rays transmitted through the optical conductor cable have directional characteristics. Supposing that the end portion of the optical conductor cable is cut off and that the light rays are emitted therefrom, the radiation angle for the focused light rays is, in general, equal to approximately 46°. That is quite a narrow field. In the case of utilizing the light energy as described above, it is impossible to perform a desirable amount of illumination by simply cutting off the end portion of the optical conductor cable and by letting light rays emit therefrom. Therefore, the present applicant has already proposed various kinds of light radiators capable of effectively diffusing light rays which have been transmitted through an optical conductor cable and for radiating the same, as illumination, over a desired area.

SUMMARY OF THE INVENTION

It is an object of the present invention to provide a light radiator capable of effectively emitting solar rays or artificial light rays which were transmitted through an optical conductor cable outside the same for nurturing plants.

It is another object of the present invention to provide a light radiator capable of effecitvcly moving the optical means installed in a transparent cylinder.

It is another object of the present invention to place transparent water in a transparent cylinder as a light rays transmission medium.

It is another object of the present invention to effectively utilize the light rays guided into the cylinder by connecting the plural light radiators in cascade in order with each other.

The above-mentioned features and other advantages of the present invention will be apparent from the following detailed description which goes with the accompanying drawings.

DESCRIPTION OF THE PREFERRED EMBODIMENTS

Figure 1:
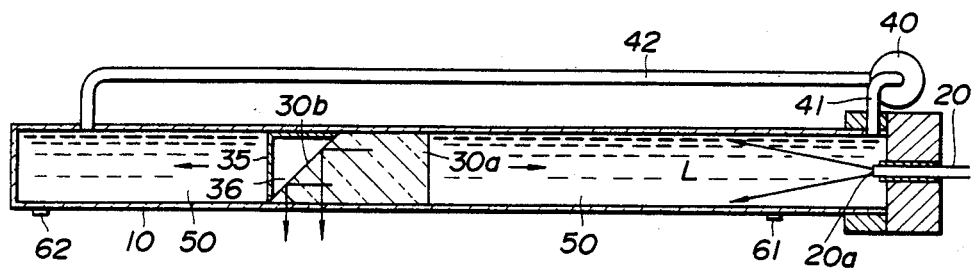
FIG. 1 is a cross-sectional view for explaining an embodiment of a light radiator previously proposed by the present applicant.

FIG. 1 is a cross-sectional view for explaining an embodiment of a light radiator previously proposed by the present applicant. In FIG. 1, 10 is a transparent cylinder, 20 is an optical conductor, 30 is an optical means, and 40 is a liquid pump. A light-emitting end 20a of the optical conductor 20 is provided at one end portion of the cylinder 10. The light rays transmitted through the optical conductor 20 are emitted into the cylinder 10 from the light-emitting end 20a of the optical conductor 20 and transmitted in the cylinder 10 toward the other end portion thereof by being reflected on the inner wall surface and the outer wall surface of the cylinder 10.

The cylinder 10 is filled with an optical oil 50 and a transparent cylindrical optical means 30 is slidably installed therein. One end surface 30a of the optical means 30, that is, a surface located at the side for receiving the light rays is formed in a state of a plane not inclined while the other end surface thereof is formed in a state of an inclined plane 30b. An air chamber 36 is built up by use of a cover member 35 at the outside of the inclined surface 30b.

Consequently, the light rays L guided into the cylinder 10, as mentioned above, enter the optical means 30 through the plane 30a thereof, and then the light rays L are reflected on the inclined plane 30b at the opposite side thereof and emitted outside of the cylinder 10. Plants are cultivated outside of the cylinder 10. The light rays, emitted from the cylinder 10 in such a manner as mentioned heretofore, are supplied to the plants as a photo-synthesis reaction light source for the plants.

Furthermore, the open end of a pipe 41 is located at one end portion of the cylinder 10 and that of another pipe 42 is located at the other end portion of the cylinder 10, and differential pressure is applied between both ends of the optical means 30 by use of the pipes 41 and 42. The optical means 30 can be moved inside of the cylinder 10 by the action of the differential pressure. The light rays can thereby be supplied over a wide area.

In FIG. 1, 61 and 62 are photo-sensors mounted on the outer circumferential surface of the cylinder 10 at the side where the light rays reflected by use of the optical means 30 pass through. The photo-sensor 61 detects that the optical means 30 has arrived at one end of the cylinder 10 and the detection signal generated by the photo-sensor 61 controls the liquid pump 40 so as to create the differential pressure needed to move the optical means 30 toward another end of the cylnder 10. On the contrary, the photo-sensor 62 detects that the optical means 30 has arrived at another end of the cylinder 10 and the detection signal generated by the photo-sensor 62 controls the liquid pump 40 so as to create the differential pressure needed to move the optical means 30 toward the above-mentioned end of the cylinder 10 at this time.

The photo-sensors 61 and 62 are constructed in such a way that the sensors can be mounted on and removed from the cylinder 10 or the sensors can be moved along the cylinder 10. Therefore, it would be possible to optionally set the movement area of the optical means 30 and thereby to effectively supply the light rays, transmitted throught he optical conductor 20, to the plants.

However, in the afore-mentioned light radiator previously proposed by the present applicant, the optical oil 50, which is very expensive, is employed to fill the cylinder 10 as a way of moving the optical means 30 inside of the cylinder 10 and as a medium for transmitting the light rays therein. Furthermore, the light rays guided into the cylinder tend to leak to the rear side of the optical means through the side wall of the cylinder or by passing through the optical means portion. Consequently the utilization efficiency is not always sufficient. And further, since the cylinder is linear, the light rays can only be distributed in a linear fashion along the axis of the light radiator. Therefore, the light rays cannot always be distributed sufficiently for illuminating a desired area.

The present invention was created in consideration of the actual circumstances as mentioned above. In particular, the aims of the present invention is to decrease the cost of its construction by employing transparent water instead of the afore-mentioned optical oil and further to improve its utilization efficiency by having the plural light radiators connected in cascade.

Figure 2:
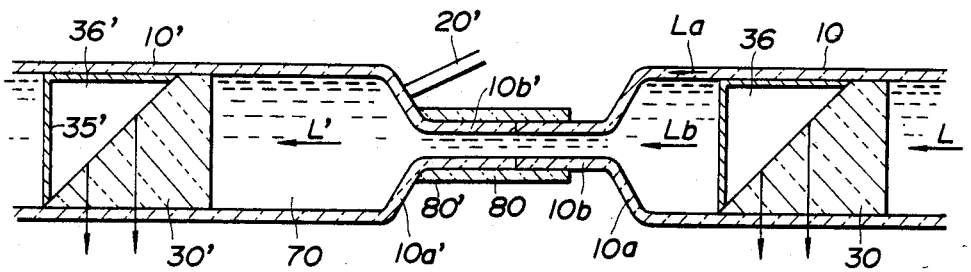
FIG. 2 is a cross-sectional view of the principal construction for explaining an embodiment of a light radiator according to the present invention.

FIG. 2 is a cross-sectional view for explaining an embodiment of a light radiator according to the present invention. In FIG. 2, the same reference numeral as that of FIG. 1 is attached to the part performing the same action as that of FIG. 1. However, in the present invention, transparent water 70 is enclosed in the transparent cylinder 10. The light rays L emitted into the cylinder 10 from the optical conductor are transmitted in transparent water and arrive at the optical means 30 as in the case of the light radiator shown in FIG. 1. The light rays are reflected on the inclined surface of the optical means 30 and discharged outside of the cylinder 10.

Furthermore, in the light radiator shown in FIG. 2, the end portion of the cylinder 10 is formed in the state of a narrow tube 10b with a tapered portion 10a. The end portion thereof can be connected with the other light radiator 10' through the tube portion 10a. Moreover, 80 is a transparent connecting tube for connecting the cylinder 10 with the cylinder 10'. The light rays L guided into the cylinder 10 are reflected on the optical means 30 as mentioned above and discharged outside of the cylinder 10.

On that occasion, a part of the light rays passes through the wall of the cylinder 10 as shown by an arrow La or leaks from the optical means 30 as shown by an arrow Lb. Such a part of the light rays may become loss component thereof. In the light radiator shown in FIG. 2, the light rays leaking in such a way can also be utilized effectively. The light rays La passing through the wall of the cylinder 10 are radiated into the next-stage cylinder 10' at the inclined portion 10a' of the following light radiator 10', and the light rays Lb passing through the narrow tube portion 10b are also radiated into the cylinder 10'. Therefore, if the same optical means 30' as mentioned before is enclosed in the cylinder 10', the light rays L' radiated into the cylinder 10', in such a manner as mentioned above, are discharged outside of the cylinder 10' by the use of the optical means 30'.

When the light rays La passing through the wall of the light radiator pass through the inclined portion 10a thereafter, the value of N·A increases so that the light rays are apt to leak outside therefrom. Consequently, it is necessary to employ a substance of high transparency as the tube 80 and to make the external side portion thereof air-clad. And then, in order to effectively guide the light rays entering the tube 80 into the following light radiator 10', the rear end 80' of the tube 80 is preferably elongated in the direction of the inclined front end portion 10a' of the following light radiator 10'.

Furthermore, if the narrow tube portion 10b of the light radiator 10 is brought into close contact with the narrow tube portion 10b' of the following light radiator 10' as shown in FIG. 2, the light rays passing through the wall of the narrow tube portion 10b are effectively transmitted to the following narrow tube portion 10b'. However, since those narrow tube portions are filled with optical paste, water or the like, the loss of transmission is not so large even though the narrow tube portions are separated from each other. In the case of employing the tube 80 constructed with a resilient substance, a large number of light radiators can be preferably connected in cascade so as to combine those light radiators in a desired form as shown in FIG. 3.

Figure 3:
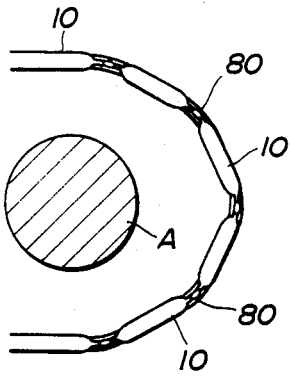
FIG. 3 is a view showing light radiators connected in cascade according to the present invention.

FIG. 3 is a view showing a state of connecting plural light radiators in cascade as mentioned above. In such a manner, it is possible to construct a light radiator having a desired shape, as a whole, by combining a plurality of light radiators. For instance, in the case of combining the light radiators as shown in FIG. 2, the light rays can be radiated from the outside toward the area A. When the plants are cultivated on the area A, it will be possible to effectively supply light rays to the plants.

Moreover, in the case of connecting the light radiators in cascade as mentioned above, the amount of the light rays decreases at the following lower stage thereof as a matter of course. In order to prevent such a defect by utilizing the inclined surface 10a' of the light radiator 10', the end surface of the optical conductor 20' is brought into close contact with the inclined surface 10' thereof so as to let the light rays enter the light radiator through the inclined surface. In such a manner, the light rays can be almost uniformly emitted from all of the light radiators.

As is apparent from the foregoing description, according to the present invention, since transparent water is employed as a light rays transmission medium and as a means for moving the optical means, the cost of the light radiator can be decreased. In addition, the present invention has the merit to effectively utilize the light rays guided into the cylinder by connecting the plural light radiators in cascade.

I claim:

1. A light radiator, characterized in that said light radiator is comprised of a transparent cylinder, an optical conductor for guiding light rays into said cylinder through one end of said cylinder, an optical means movably accommodated inside of said cylinder for reflecting said light rays guided into said cylinder from said optical conductor and for radiating said light rays outside of said cylinder, and a driving means for moving said optical means along the axis of said cylinder, said driving means being comprised of transparent water placed in said cylinder and a liquid pump having one end connected with oen end of said cylinder and the other end connected with the other end of said cylinder, and said water being moved inside of said cylinder by the use of said liquid pump.

2. A light radiator comprised of a transparent cylinder, an optical conductor for guiding light rays into said cylinder through one end of said cylinder, an optical means which is movably accommodated inside of said cylinder for reflecting said light rays guided into said cylinder from said optical conductor and for radiating said light rays outside of said cylinder, and a driving means for moving said optical means along the axis of said cylinder, and in which said driving means is comprised of transparent water placed in said cylinder and a liquid pump havng one end connected with one end of said cylinder and the other end connected with the other end of said cylinder and said water is moved inside of said cylinder by use of said liquid pump in order to move said optical means inside of said cyliner, characterized in that at least one end portion of said transparent cylinder is formed in the state of a narrow tube with a tapered portion.

3. A light radiator as defined in claim 2, characterized in that the light rays from said optical conductor are radiated into said cylinder through said tapered portion.

4. A light radiator as defined in claim 2 or 3, characterized in that plural light radiators are connected in cascade with said narrow tube.

5. A light radiator as defined in claim 4, characterized in that said narrow tube is covered with a resilient transparent tube.

6. A light radiator as defined in claim 5, characterized in that one end of said narrow tube is elongated so as to reach the tapered portion of the following light radiator.

* * * * *